US008881620B2

(12) United States Patent
Togashi et al.

(10) Patent No.: US 8,881,620 B2

(45) Date of Patent: Nov. 11, 2014

(54) OPERATING DEVICE

(75) Inventors: Yoshio Togashi, Kobe (JP); Noriaki Inoue, Kobe (JP); Satoshi Akamatsu, Kobe (JP); Kenji Nakamura, Kobe (JP); Fumio Kameyama, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 14/005,907

(22) PCT Filed: Mar. 9, 2012

(86) PCT No.: PCT/JP2012/001628

§ 371 (c)(1), (2), (4) Date: Nov. 18, 2013

(87) PCT Pub. No.: WO2012/127804

PCT Pub. Date: Sep. 27, 2012

(65) Prior Publication Data

US 2014/0070123 A1 Mar. 13, 2014

(30) Foreign Application Priority Data

Mar. 18, 2011 (JP) ................................ 2011-060505

(51) Int. Cl.

| | |
|---|---|
| ***G05G 5/06*** | (2006.01) |
| ***F16K 31/06*** | (2006.01) |
| ***F16K 11/14*** | (2006.01) |
| ***F16K 31/60*** | (2006.01) |
| *G05G 1/04* | (2006.01) |

(52) U.S. Cl.

CPC .............. *F16K 31/0675* (2013.01); *G05G 5/06* (2013.01); *F16K 11/14* (2013.01); *F16K 31/60* (2013.01); *G05G 1/04* (2013.01)

USPC .................... 74/527; 74/497; 74/529; 74/567

(58) Field of Classification Search

USPC .................................... 74/497, 527–542, 567

See application file for complete search history.

(56) References Cited

U.S. PATENT DOCUMENTS 5,156,065 A * 10/1992 Fujimoto et al. ................ 74/527

FOREIGN PATENT DOCUMENTS

| | | |
|---|---|---|
| JP | B2-4-23153 | 4/1992 |
| JP | B2-3493338 | 2/2004 |

* cited by examiner

*Primary Examiner* — Ramon Barrera

(74) *Attorney, Agent, or Firm* — Oliff PLC

(57) ABSTRACT

A hydraulic operated valve includes an electromagnetic adsorption mechanism and a steel ball. In the electromagnetic adsorption mechanism, when a current is supplied, an adsorption plate is adsorbed by a solenoid. By this adsorption, a steel ball is pressed against an outer surface of a cam disc. The outer surface of the cam disc includes two steps. When the cam disc is rotated clockwise or counterclockwise, the pressed steel ball engages the two steps. Thus, the cam disc is detented. These two steps are configured such that when the cam disc is returned to a neutral position, the adsorption plate is separated from the solenoid against the pressing of the electromagnetic adsorption mechanism. Thus, the detent state of the cam disc is canceled.

8 Claims, 6 Drawing Sheets

BACKWARD
FORWARD
12
21
23
22
24
7d
31
d
32a
32
7f
7c
31a
7e
7
2
4
8
L1
7j
7i
20
7a
18
7b
19
16
15
13
11
3

OPERATING DEVICE

TECHNICAL FIELD

The present invention relates to an operating device configured to remote-control an actuator provided at a construction machinery, or the like.

BACKGROUND ART

A construction machinery, such as a crane, includes an operating device configured to remote-control a boom actuator, a bucket actuator, or the like via a main hydraulic switching valve. The operating device includes a tiltable lever and controls the amount of oil supplied to the actuator in accordance with a tilt amount of the lever. In many cases, a plurality of operating devices are provided at the construction machinery so as to be coupled to one another, and in some cases, the plurality of operating devices are operated at the same time. In such a case, the lever is required to be temporarily held at an intermediate position where the lever is tilted from a neutral position by a predetermined tilt amount, or at a stroke end. To realize this, the operating device includes a detent mechanism configured to temporarily fix the lever at the intermediate position or the stroke end. Examples of the detent mechanism include a mechanical detent mechanism described in PTL 1 and an electromagnetic detent mechanism described in PTL 2.

The mechanical detent mechanism described in PTL 1 includes a cam disc configured to rotate together with a lever, and a steel ball is pressed against an outer peripheral surface of the cam disc by a detent spring. When the lever is tilted, the steel ball is displaced relative to the cam disc along the outer peripheral surface of the cam disc. A step is formed on the outer peripheral surface of the cam disc. When the lever is further tilted, the steel ball falls down along the step. When returning the tilted lever back in a neutral direction after the steel ball has fallen down from the step, the fallen steel ball hits the step. Since the steel ball is pressed against the outer peripheral surface of the cam disc by the detent spring, the steel ball engages with the step to inhibit the cam disc from returning in cooperation with the step, that is, the steel ball detents the cam disc. When a cancel torque is applied to the detented cam disc in a direction toward the neutral position, the detent state of the cam disc is canceled. The adjustment of the cancel torque necessary to cancel the detent state can be performed by adjusting a pressing margin of the detent spring.

PTL 2 describes first and second electromagnetic detent mechanisms. The first electromagnetic detent mechanism of an operating device includes an electromagnetic adsorption mechanism and a detent plate. The electromagnetic adsorption mechanism includes a detent pin, and a coil plate is attached to the detent pin. The electromagnetic adsorption mechanism includes a magnetic coil provided so as to surround the detent pin. When a current is supplied to the magnetic coil, the coil plate is attracted by the magnetic coil to restrict the downward movement of the projecting detent pin by a certain force. The detent plate moves in a left-right direction integrally with the lever. When the lever is tilted to move the detent plate to a predetermined intermediate position, the projecting detent pin engages with the detent plate. With this engagement, the detent plate is detented at the intermediate position. The detent state of the detent plate is canceled by the application of the cancel torque in the direction toward the neutral position. The cancel torque necessary to cancel the detent state can be adjusted in accordance with the current supplied to the electromagnetic adsorption mechanism.

The electromagnetic adsorption mechanism is provided with a spring configured to bias the coil plate toward the magnetic coil. Even in a case where the detent pin is pushed back when canceling the detent state, an interval between the coil plate and the magnetic coil can be favorably maintained by the spring.

The electromagnetic adsorption mechanisms configured as above are respectively provided at both left and right sides of the detent plate. Therefore, even in a case where the detent plate moves to the left or right, the electromagnetic adsorption mechanism can detent the detent plate.

In an operating device including the second electromagnetic detent mechanism described in PTL 2, an operating rod moves in accordance with the tilting of the lever to bias a valve element (such as a spool). The detent mechanism is provided with an electromagnetic adsorption mechanism and a friction detent member. The electromagnetic adsorption mechanism is similar in configuration to the electromagnetic adsorption mechanism adopted in the first electromagnetic detent mechanism, and a detent member is provided at a tip end of the electromagnetic adsorption mechanism. The friction detent member is provided such that the operating rod is inserted therethrough. When a current is supplied to the electromagnetic adsorption mechanism, the friction detent member is pressed against the operating rod. Thus, the operating rod can be detented at an arbitrary position. When the supply of the current to the electromagnetic adsorption mechanism is stopped, the friction detent member is separated from the operating rod. Thus, the detent state is canceled.

As with the above, in the second electromagnetic detent configured as above, the electromagnetic adsorption mechanisms are respectively provided at both left and right sides of the lever. Each electromagnetic adsorption mechanism is provided with one operating rod. With this, even in a case where the lever is tilted to the left or right, the lever is detented.

CITATION LIST

Patent Literature

PTL 1: Japanese Patent No. 3493338

PTL 2: Japanese Examined Patent Application Publication No. 4-23153

SUMMARY OF INVENTION

Technical Problem

A detent function is necessary in some operations but may be unnecessary or restricted in the other operations. In the case of the mechanical detent mechanism as in PTL 1, the detent mechanism itself needs to be detached from the operating device such that the detent function cannot be used. This detaching operation is extremely troublesome. Therefore, the detent mechanism itself may be detached from the operating device in advance. However, depending on operation contents, the detent mechanism is necessary in some cases. In this case, it is necessary to additionally prepare the construction machinery provided with the detent mechanism. Instead, the detent mechanism may be again attached to the operating device when the detent function is necessary. However, in a case where the detent mechanism is attached again, the position and the like thereof need to be finely adjusted. This adjustment is extremely difficult.

In the case of the first and second electromagnetic detent mechanisms described in PTL 2, the detent function can be disabled by reducing a biasing force of the spring of the electromagnetic adsorption mechanism and stopping the current supplied to the electromagnetic adsorption mechanism. Therefore, even in a case where the detent function is unnecessary, the detent mechanism does not have to be detached, and the detent function can be enabled or disabled only by supplying or stopping the current to the electromagnetic adsorption mechanism according to need.

However, since the first electromagnetic detent mechanism includes the detent plate formed separately from an operating plate, a casing for horizontally holding the detent plate, a spherical rotating body, and the like, it is complex in structure. In addition, the second electromagnetic detent mechanism is a friction type and can hold the operating rod at an arbitrary position. However, for example, one problem is that there is a possibility that the second electromagnetic detent mechanism cannot hold the operating rod by wear of a friction slide portion. Therefore, in fact, it is extremely difficult to produce the operating device described in PTL 2.

Here, an object of the present invention is to provide an operating device, which is easily produced and has a detent function that can be enabled and disabled.

Solution to Problem

An operating device of the present invention is an operating device configured to switch an output direction in accordance with a rotation direction of a cam and generate an output value corresponding to a rotation angle of the cam, the operating device including: an engaging member configured to contact an outer surface of the cam; and an electromagnetic adsorption mechanism configured to, when a current is supplied to an excitation unit, cause an adsorbing body to be adsorbed by the excitation unit and press the engaging member toward the outer surface of the cam, wherein: two steps are formed on the outer surface of the cam, each of the steps being configured to, when the cam is rotated, engage with the engaging member, pressed by the electromagnetic adsorption mechanism, to detent the cam; and the two steps are configured such that by returning the cam, the adsorbing body is separated from the excitation unit against pressing of the electromagnetic adsorption mechanism.

According to the present invention, when a current is supplied to the excitation unit, the engaging member is pressed against the outer surface of the cam, and the cam is detented by each step. When the cam is returned from this state, the adsorbing body is separated from the excitation unit. Eventually, the engagement between the cam and the step is canceled. Thus, the detent state of the cam is canceled. With this, the cam can be returned. In contrast, when the supply of the current to the excitation unit is stopped, the engaging member is not pressed against the outer surface of the cam. Therefore, the engaging member does not engage with each step. To be specific, the detent function is disabled. As above, the detent function can be enabled and disabled only by supplying or not supplying the current to the excitation unit. For example, in a case where the detent function is not used due to operation contents or even in a case where the use of the detent function is being legally banned, the detent function can be easily stopped.

In the present invention, two steps by each of which the cam is detented are formed on the outer surface of the cam. When the cam is rotated in one direction, the engaging member engages with one of the steps. When the cam is rotated in the other direction, the engaging member engages with the other step. To be specific, even in a case where the cam is rotated in one direction or the other direction, the cam can be detented by the single engaging member. Thus, the detent functions can be achieved by the single electromagnetic adsorption mechanism. Therefore, components which require positional accuracy can be reduced, and this facilitates the production of the operating device.

In the above invention, it is preferable that: the outer surface of the cam include a middle region located between the two steps and two outer regions respectively located on both sides of the middle region and connected to the middle region via the steps; and the two steps respectively include inclined surfaces, with each of which the engaging member contacts, a gradient θ formed by each of the inclined surfaces and the adjacent outer region being not smaller than 150° and not larger than 165°.

In a case where the electromagnetic adsorption mechanism is adopted, a range in which the adsorbing force acts is extremely small. Therefore, a shock may be caused by a sudden cancellation of the detent state. According to the above configuration, while firmly detenting the cam when the engaging member engages at the inclined surface, the detent state can be prevented from being suddenly canceled by suddenly separating the excitation unit from the adsorbing body when returning the cam. With this, while firmly holding the cam at the intermediate position, the operational feeling when canceling the detent state can be favorably maintained.

In the above invention, it is preferable that the operating device further include a current adjuster configured to adjust a value of a current, supplied to the excitation unit of the electromagnetic adsorption mechanism, to control a pressing force applied to the engaging member. According to this configuration, the magnitude of the cancel torque necessary when rotating the cam to cancel the detent state can be changed. With this, the operational feeling when canceling the detent state can be changed.

In the above invention, it is preferable that: the operating device further include a pressing mechanism configured to bias a contact member by a spring member to press the contact member against the outer surface of the cam; and three grooves be formed on the outer surface of the cam, the contact member engaging with each of the three grooves in a case where the cam is located at each of a neutral position that is a base point when rotating the cam and two stroke end positions respectively located away from the neutral position to one side and the other side.

According to the above configuration, the cam can be held at the neutral position and the stroke ends by the grooves and the contact member. The pressing mechanism is configured such that the contact member is biased by the spring member to be pressed. Therefore, even if the processing accuracy and positional accuracy of the pressing mechanism are low, the operating device can absorb those low accuracy. By adopting such a pressing mechanism, it is possible to easily produce the operating device that realizes both the switching of the detent functions and the holding functions at the neutral position and the stroke ends by the electromagnetic adsorption mechanism.

Advantageous Effects of Invention

According to the present invention, it is possible to realize the operating device that includes the detent function, which can be enabled and disabled, and is easily produced.

The above object, other objects, features and advantages of the present invention will be made clear by the following detailed explanation of preferred embodiments with reference to the attached drawings.

DESCRIPTION OF EMBODIMENTS

Hereinafter, an operating device of an embodiment of the present invention will be explained in reference to the above drawings. The concept of directions described below substantially corresponds to the concept of directions when a driver of a construction machinery looks in a proceeding direction. However, the below-described concept of directions is just one example, and the present embodiment is not limited to this.

Figure 1:
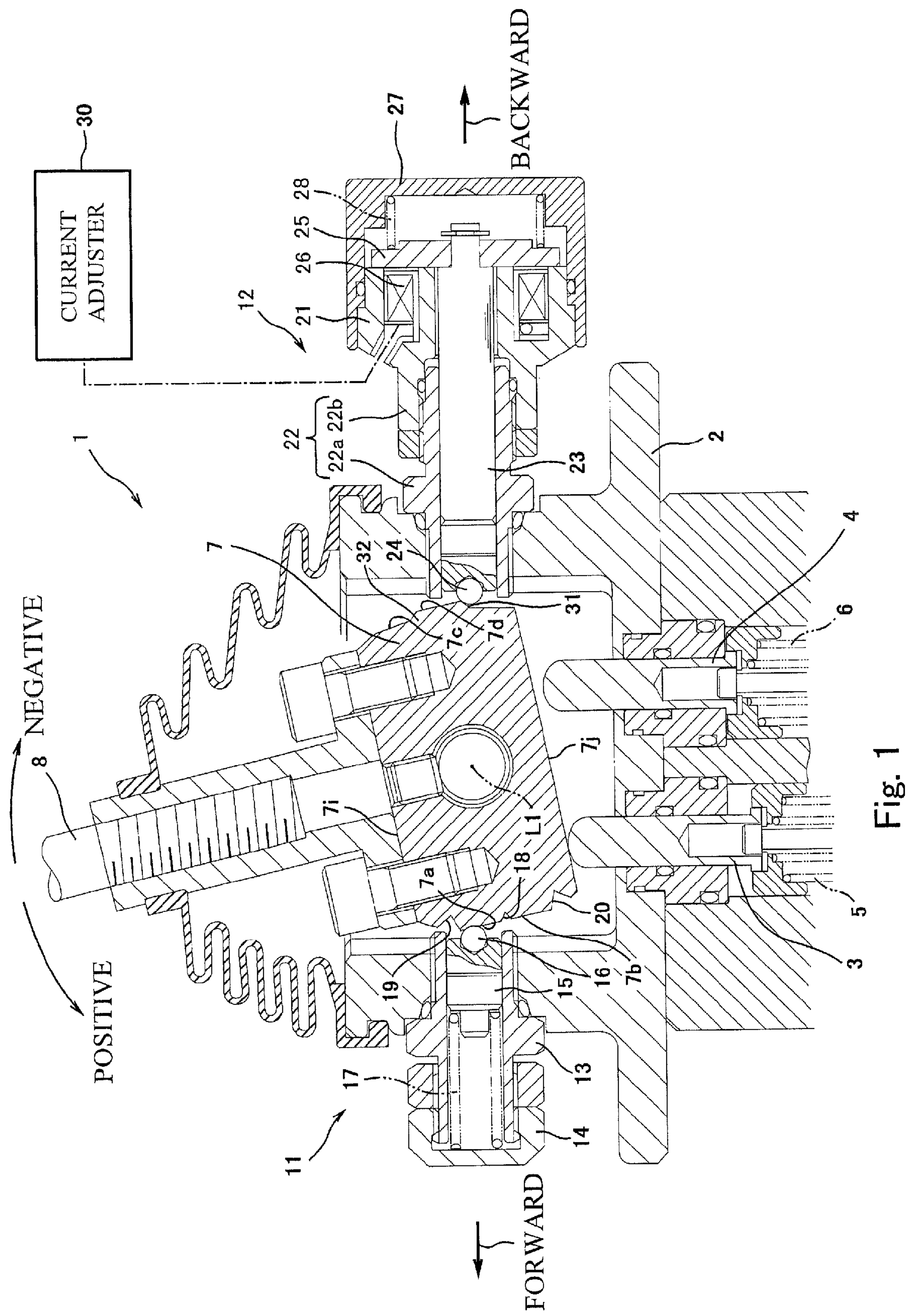
FIG. 1 is a cross-sectional view showing a part of a hydraulic operated valve that is one example of an embodiment of the present invention.

A hydraulic operated valve 1 that is one example of the operating device as shown in FIG. 1 is provided at a driver's seat of a construction machinery, such as a crane. The hydraulic operated valve 1 can control the direction and flow rate of operating oil flowing through actuators, not shown, such as a boom cylinder and a bucket cylinder. The hydraulic operated valve 1 includes a housing 2 fixed to a console of the driver's seat, for example. The housing 2 houses first and second push rods 3 and 4 such that the first and second push rods 3 and 4 are displaceable in an upper-lower direction. The first and second push rods 3 and 4 displace downward to respectively push down two spools, not shown. One of these two spools and the housing 2 constitute one direction switching valve, and the other spool and the housing 2 constitute the other direction switching valve. When the spool is pushed down, the direction switching valve causes the operating oil to flow through a main hydraulic switching valve to a corresponding port of the actuator.

The first and second push rods 3 and 4 are respectively biased upward by the springs 5 and 6 to return to reference positions. When the first or second push rod 3 or 4 is pushed down from the reference position, the direction switching valve generates secondary pressure as an output value corresponding to a push-down amount. When the first and second push rods 3 and 4 configured as above are located at the reference positions, upper end portions thereof contact a lower end surface 7*j* of a cam disc 7.

The cam disc 7 is provided in the housing 2 so as to rotate about an axis line L1. The cam disc 7 is a plate-shaped member whose upper and lower end surfaces are substantially parallel to each other and each of whose front and rear surfaces has a circular-arc shape about the axis line L1. A lever 8 is integrally provided on an upper end surface 7*i* of the cam disc 7. The lever 8 extends in a direction perpendicular to the upper end surface 7*i* of the cam disc 7. A state where the lever 8 extends in a vertical direction corresponds to a natural state of the cam disc 7, and the position of the cam disc 7 at this time is a neutral position. At this neutral position, the lower end surface 7*j* of the cam disc 7 contacts the upper end portions of the first and second push rods 3 and 4. When the lever 8 is tilted forward (to the left in FIG. 1) from the neutral position to incline the cam disc 7 diagonally right up, the first push rod 3 is pushed downward. In contrast, when the lever 8 is tilted rearward (to the right in FIG. 1) to incline the cam disc 7 diagonally left up, the second push rod 4 is pushed downward. At this time, the first or second push rod 3 or 4 is pushed downward by a push-down amount corresponding to a tilt angle of the lever 8, that is, a rotation angle of the cam disc 7, and the direction switching valve generates the secondary pressure corresponding to the push-down amount. To be specific, the hydraulic operated valve 1 generates the secondary pressure corresponding to the rotation angle of the cam disc 7.

The hydraulic operated valve 1 configured as above includes two detent mechanisms 11 and 12. Each of the two detent mechanisms 11 and 12 is a mechanism configured to hold the cam disc 7 in an inclined state and inhibit the cam disc 7 from returning to the neutral position. The two detent mechanisms 11 and 12 are provided at the housing 2 so as to be respectively located at positions that are rotationally symmetric with respect to an axis line passing through the center of the housing 2. One of the two detent mechanisms 11 and 12 is a mechanical detent mechanism 11, and the other detent mechanism is an electromagnetic detent mechanism 12.

Figure 2:
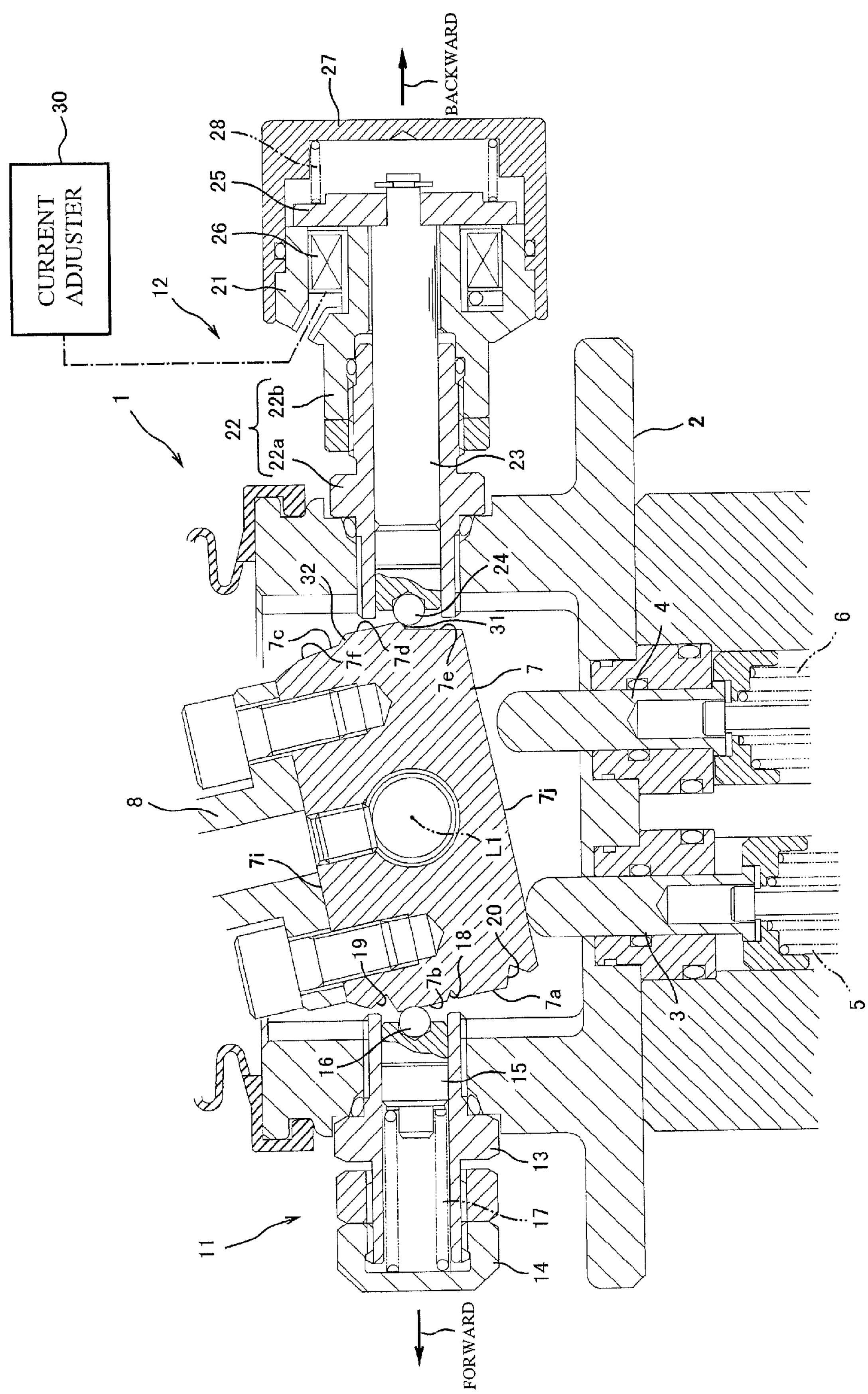
FIG. 2 is an enlarged cross-sectional view showing a part of the hydraulic operated valve of FIG. 1.

First, the mechanical detent mechanism 11 will be explained in reference to FIGS. 1 and 2. The mechanical detent mechanism 11 that is a pressing mechanism includes a substantially tubular holding tube 13. A lid body 14 is threadedly engaged with one of opening end portions of the holding tube 13 so as to close the opening end portion. A movable piece 15 is housed in the holding tube 13 and moves along an axis line of the holding tube 13. A tip end portion of the movable piece 15 projects from the other opening end portion of the holding tube 13. A steel ball 16 that is a contact member is buried in the tip end portion of the movable piece 15 such that a part thereof is exposed. A first spring member 17 is provided between a base end portion of the movable piece 15 and the lid body 14, and the movable piece 15 is biased by the first spring member 17.

The mechanical detent mechanism 11 configured as above is provided at the housing 2 in such a manner that the holding tube 13 is threadedly engaged with a side surface of the housing 2. The holding tube 13 penetrates the housing 2. The tip end portion of the movable piece 15 housed in the holding tube 13 is opposed to a front surface 7*a* (surface on the left side in FIG. 1) of the cam disc 7, and the steel ball 16 provided at the tip end portion of the movable piece 15 contacts the front surface 7*a* of the cam disc 7. Since the movable piece 15 is biased by the first spring member 17, the steel ball 16 is pressed against the front surface 7*a* of the cam disc 7. A pressing force when pressing the steel ball 16 against the front surface 7*a* can be adjusted by changing a biasing force of the first spring member 17, and the biasing force of the first spring member 17 can be adjusted by rotating the lid body 14 to change the relative position of the lid body 14 relative to the holding tube 13.

The front surface 7*a* against which the steel ball 16 is pressed includes a plurality of grooves. Hereinafter, the front surface 7*a* will be explained in reference to FIG. 3 in addition to FIGS. 1 and 2. The front surface 7*a* includes three concave grooves 18, 19, and 20. These three concave grooves 18, 19, and 20 are V-shaped grooves depressed in a radially inward direction of the cam disc 7. These three concave grooves 18,

19, and 20 are formed on the front surface 7*a* at regular intervals. When the cam disc 7 is located at the neutral position, the steel bail 16 fits in and engages with the concave groove 18 formed at the middle position. When the steel ball 16 engages with the concave groove 18, the cam disc 7 is held at the neutral position.

The held state of the cam disc 7 is canceled in such a manner that the steel ball 16 is detached from the concave groove 18 by rotating the cam disc 7 by the lever 8. When canceling the held state, a predetermined cancel torque needs to be applied to the lever 8. To reduce the cancel torque, the width of the concave groove 18 is made small. With this, a portion of the steel ball 16 which fits in the concave groove 18 becomes small, so that the cancel torque becomes small. Thus, the cam disc 7 located at the neutral position can be caused to move by the small cancel torque.

A middle region 7*b* around the concave groove 18 formed as above is formed parallel to a virtual flat surface perpendicular to a vertical end of the cam disc 7 and is flat. Therefore, when the steel ball 16 is pressed against the middle region 7*b*, a torque that causes the cam disc 7 to return to the neutral position acts on the cam disc 7. Thus, the cam disc 7 easily returns to the neutral position.

Each of the two concave grooves 19 and 20 except for the concave groove 18 is formed at a position away from the concave groove 18 by a predetermined restriction angle $\theta_1$ in a circumferential direction. When the cam disc 7 is rotated from the neutral position by the restriction angle $\pm\theta_1$ (a rotation angle in a counterclockwise direction from the neutral position is positive), the steel ball 16 fits in the concave groove 19 or 20. When the steel ball 16 fits in the concave groove 19 or 20, the cam disc 7 is detented so as to be inclined at the restriction angle $\theta_1$ or the restriction angle $-\theta_1$ (first or second stroke end position) from the neutral position, and the rotation of the cam disc 7 beyond the restriction angle $\theta_1$ or the restriction angle $-\theta_1$ is restricted. By restricting the rotation of the cam disc 7 as above, stroke ends of the first and second push rods 3 and 4 are defined. When the steel ball 16 fits in the concave groove 19 or 20, the first and second push rods 3 and 4 are respectively held at the stroke ends.

The detent state of the cam disc is canceled in such a manner that to rotate the cam disc 7 in a direction toward the neutral position, the steel ball 16 is detached from the concave groove 19 or 20 by tilting the lever 8. The cancel torque necessary when canceling the detent state is made higher than the cancel torque necessary when detaching the steel ball 16 from the concave groove 18 in such a manner that the width and depth of each of the two concave grooves 19 and 20 are made larger than those of the concave groove 18 located at the middle position.

Next, the electromagnetic detent mechanism 12 will be explained in reference to FIGS. 1 and 2. The electromagnetic detent mechanism 12 includes an electromagnetic adsorption mechanism 21, and the electromagnetic adsorption mechanism 21 includes a casing 22. The casing 22 has a substantially tubular shape and is configured such that an opening portion of a tubular portion 22*a* and an opening portion of a solenoid housing portion 22*b* are threadedly engaged with each other. A rod 23 is housed in the casing 22 and slidably supported by the tubular portion 22*a*. The rod 23 has a columnar shape. A steel ball 24 that is an engaging member is buried in a tip end portion of the rod 23 such that a part thereof is exposed. A base end portion of the rod 23 projects outward from an opening portion of the solenoid housing portion 22*b*. An adsorption plate 25 is provided at the base end portion of the rod 23.

The adsorption plate 25 that is an adsorbing body is a circular-plate member made of a ferromagnetic material. The adsorption plate 25 is located outside the solenoid housing portion 22*b*, and the solenoid housing portion 22*b* houses a substantially cylindrical solenoid 26. The solenoid 26 that is an excitation unit is arranged so as to surround the rod 23, and one end portion thereof is arranged so as to be opposed to the adsorption plate 25. A current adjuster 30 is electrically connected to the solenoid 26. When a current is supplied from the current adjuster 30 to the solenoid 26, the adsorption plate 25 is adsorbed by the solenoid 26. By adjusting the value of the current by the current adjuster 30, an adsorbing force of adsorbing the adsorption plate 25 can be adjusted.

A cap member 27 is provided at the solenoid housing portion 22*b* so as to close the opening portion of the solenoid housing portion 22*b*. A second spring member 28 is provided between the cap member 27 and the adsorption plate 25. The second spring member 28 biases the adsorption plate 25 toward the solenoid 26, and the biasing force of the second spring member 28 is set to be lower than that of the first spring member 17.

The electromagnetic detent mechanism 12 configured as above is provided at the housing 2 in such a manner that the tubular portion 22*a* is threadedly engaged with a side surface of the housing 2. The casing 22 penetrates the housing 2. The tip end portion of the rod 23 housed in the casing 22 is opposed to a rear surface 7*c* (surface on the right side in FIG. 1) of the cam disc 7, and the steel ball 24 provided at the tip end portion of the rod 23 faces the rear surface 7*c*.

Figure 3:
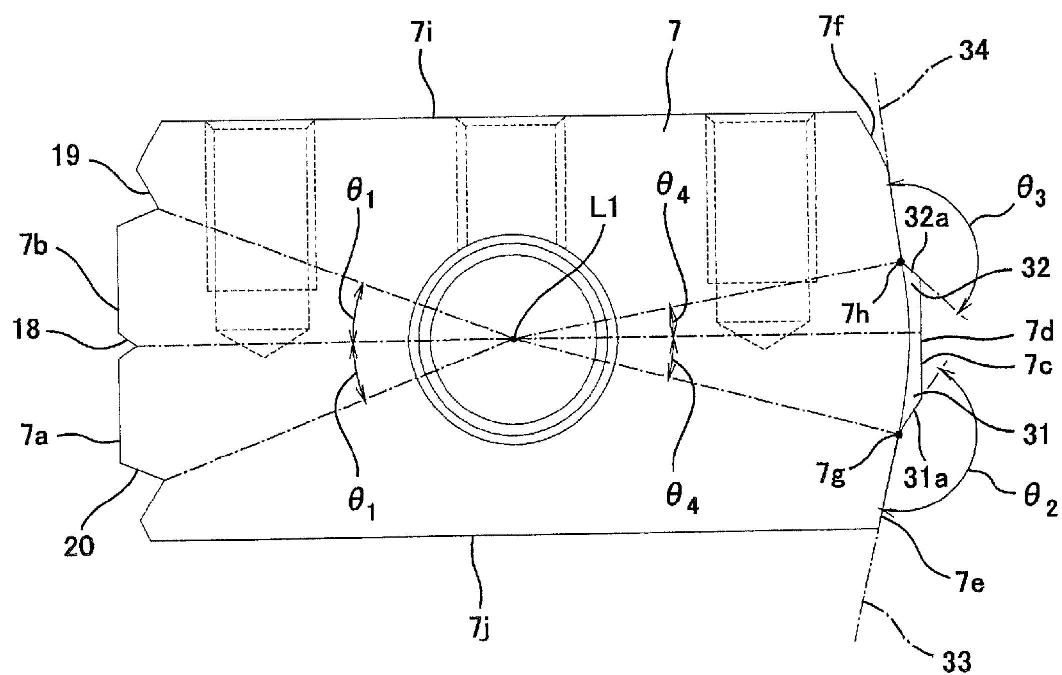
FIG. 3 is an enlarged front view showing a cam disc included in the hydraulic operated valve.

Hereinafter, the shape of the rear surface 7*c* will be explained in reference to FIGS. 1, 2, and 3. The rear surface 7*c* is formed in a substantially circular-arc shape as described above, and a middle region 7*d* of the rear surface 7*c* projects in a radially outward direction of the cam disc 7. The middle region 7*d* is flat and substantially parallel to the middle region 7*b* of the front surface 7*a*. In a state where the cam disc 7 is located at the neutral position, the steel ball 24 is seated on the middle region 7*d*, and the steel ball 24 is pressed against the middle region 7*d* of the cam disc 7 by the rod 23 biased by the second spring member 28. With this, the torque that causes the cam disc 7 to return to the neutral position acts on the cam disc 7. Thus, the cam disc 7 easily returns to the neutral position. In this state, the adsorption plate 25 is slightly separated from the solenoid 26.

By the middle region 7*d*, steps 31 and 32 are formed on the rear surface 7*c* so as to be respectively located on both sides of the middle region 7*d*. The middle region 7*d* is connected via the steps 31 and 32 to a lower region 7*e* located at a lower side of the rear surface 7*c* and an upper region 7*f* located at an upper side of the rear surface 7*c*. The lower step 31 includes a lower inclined surface 31*a*, and the upper step 32 includes an upper inclined surface 32*a*. The lower region 7*e* and the middle region 7*d* are connected to each other by the lower inclined surface 31*a*. The upper region 7*f* and the middle region 7*d* are connected to each other by the upper inclined surface 32*a*.

The lower inclined surface 31*a* and the lower region 7*e* form a gradient $\theta_2$, and the upper inclined surface 32*a* and the upper region 7*f* form a gradient $\theta_3$. The gradient $\theta_2$ formed by the lower inclined surface 31*a* and the lower region 7*e* is an angle formed by a tangential line 33 and the lower inclined surface 31*a*, the tangential line 33 being located at an intersection point 7*g* between the lower region 7*e* and the lower inclined surface 31 a. The gradient $\theta_3$ formed by the upper inclined surface 32*a* and the upper region 7*f* is an angle formed by a tangential line 34 and the upper inclined surface

32*a*, the tangential line 34 being located at an intersection point 7*h* between the upper region 7*f* and the upper inclined surface 32*a*.

Figure 4:
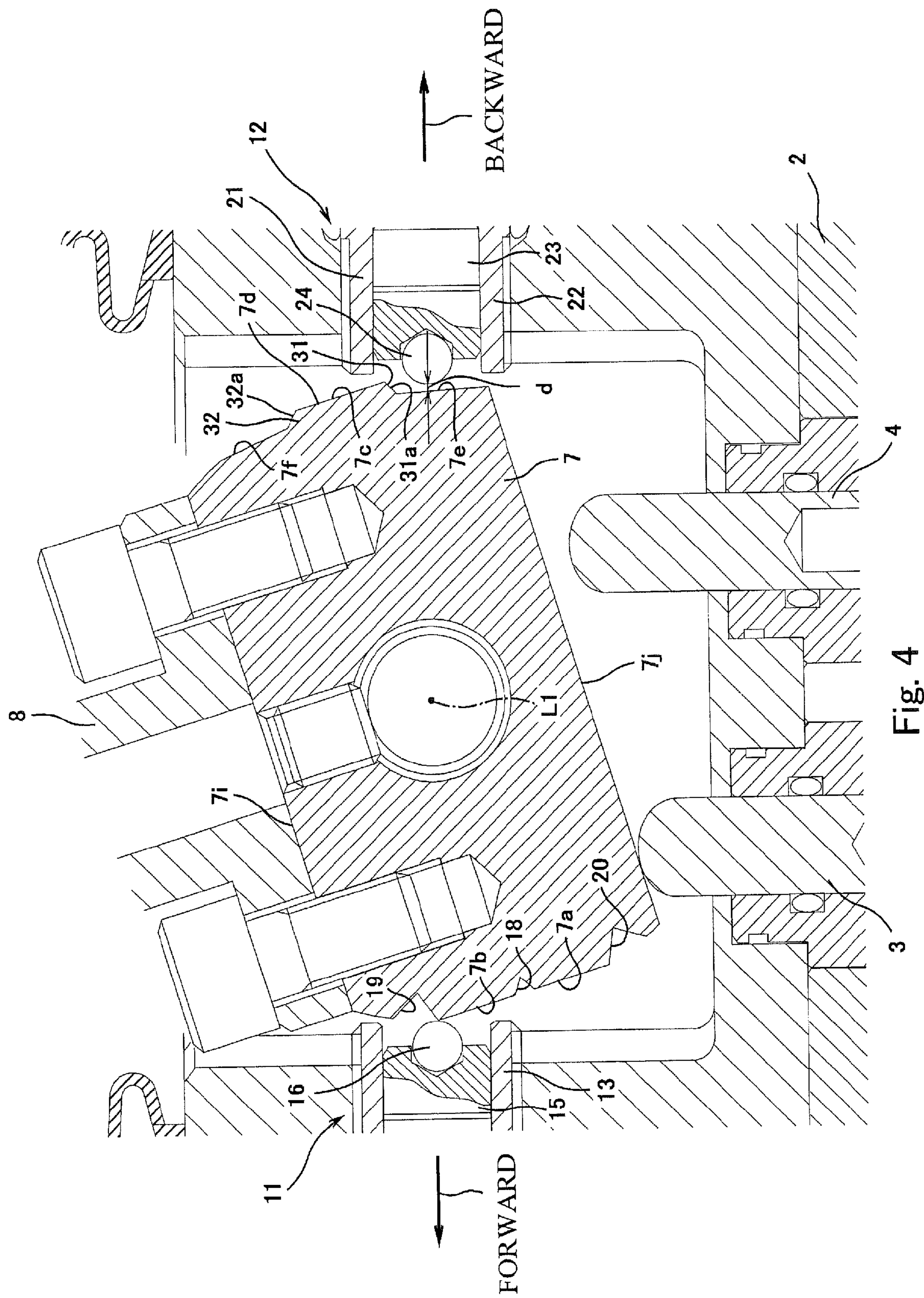
FIG. 4 is a further enlarged cross-sectional view showing the cam disc and its surroundings of the hydraulic operated valve of FIG. 2.

Due to this configuration of the rear surface 7*c*, when the lower or upper step 31 or 32 reaches the steel ball 24 by the rotation of the cam disc 7, the rod 23 moves toward the cam disc 7 by the biasing force of the second spring member 28 (in a case where a current is being supplied to the solenoid 26, the adsorbing force is also applied), and the steel ball 24 falls down from the middle region 7*d* along the lower or upper inclined surface 31*a* or 32*a*. When the steel ball 24 falls down to some extent, the adsorption plate 25 is adsorbed by the solenoid 26, so that the movement of the rod 23 stops. In this state, the steel ball 24 faces the lower or upper region 7*e* or 7*f* but does not contact the region 7*e* or 7*f*, and a slight gap d is formed between the steel ball 24 and the region 7*e* or 7*f* (see FIG. 4).

When the tilting of the lever 8 is stopped after the steel ball 24 has passed through the step 31 or 32, the cam disc 7 is caused to return toward the neutral position by the first or second push rod 3 or 4, and the steel ball 24 eventually contacts the lower or upper inclined surface 31*a* or 32*a*. At this time, in a case where a current is not being supplied to the solenoid 26, the cam disc 7 continuously rotates, and the steel ball 24 relatively moves on the lower or upper inclined surface 31*a* or 32*a* while pushing back the rod 23. Eventually, the steel ball 24 gets on the middle region 7*b* or 7*d*. Thus, the cam disc 7 returns to the neutral position.

In a case where the current is being supplied to the solenoid 26, the adsorption plate 25 is adsorbed by the solenoid 26 by the adsorbing force corresponding to the supplied current, so that the rod 23 is held at this position. Therefore, even in a case where the steel ball 24 contacts the lower or upper inclined surface 31*a* or 32*a*, the rod 23 is not pushed back, and the cam disc 7 is detented by the steel ball 24. An absolute value of the rotation angle of the cam disc 7 at the intermediate position, that is, an absolute value of an intermediate angle $\pm\theta_4$ is set to be smaller than the restriction angle $\theta_1$ and is about half the restriction angle $\theta_1$.

In a state where the cam disc 7 is detented, the lever 8 is moved in such a direction that the cam disc 7 returns to the neutral position, so that the steel ball 24 relatively moves along the lower or upper inclined surface 31*a* or 32*a*. In this case, the rod 23 is pushed back such that the adsorption plate 25 is separated from the solenoid 26. Eventually, the steel ball 24 gets on the middle region 7*d*. With this, the detent state of the cam disc 7 is canceled, and the cam disc 7 can be returned to the neutral position.

As above, even in a case where the cam disc 7 is rotated in a counterclockwise or clockwise direction, the cam disc 7 can be detented by the engagement with each of the two steps 31 and 32. To be specific, counterclockwise and clockwise detent functions can be achieved by the single electromagnetic adsorption mechanism 21. Therefore, components which require high positional accuracy can be reduced, and this facilitates the production of the hydraulic operated valve 1.

Figure 5:
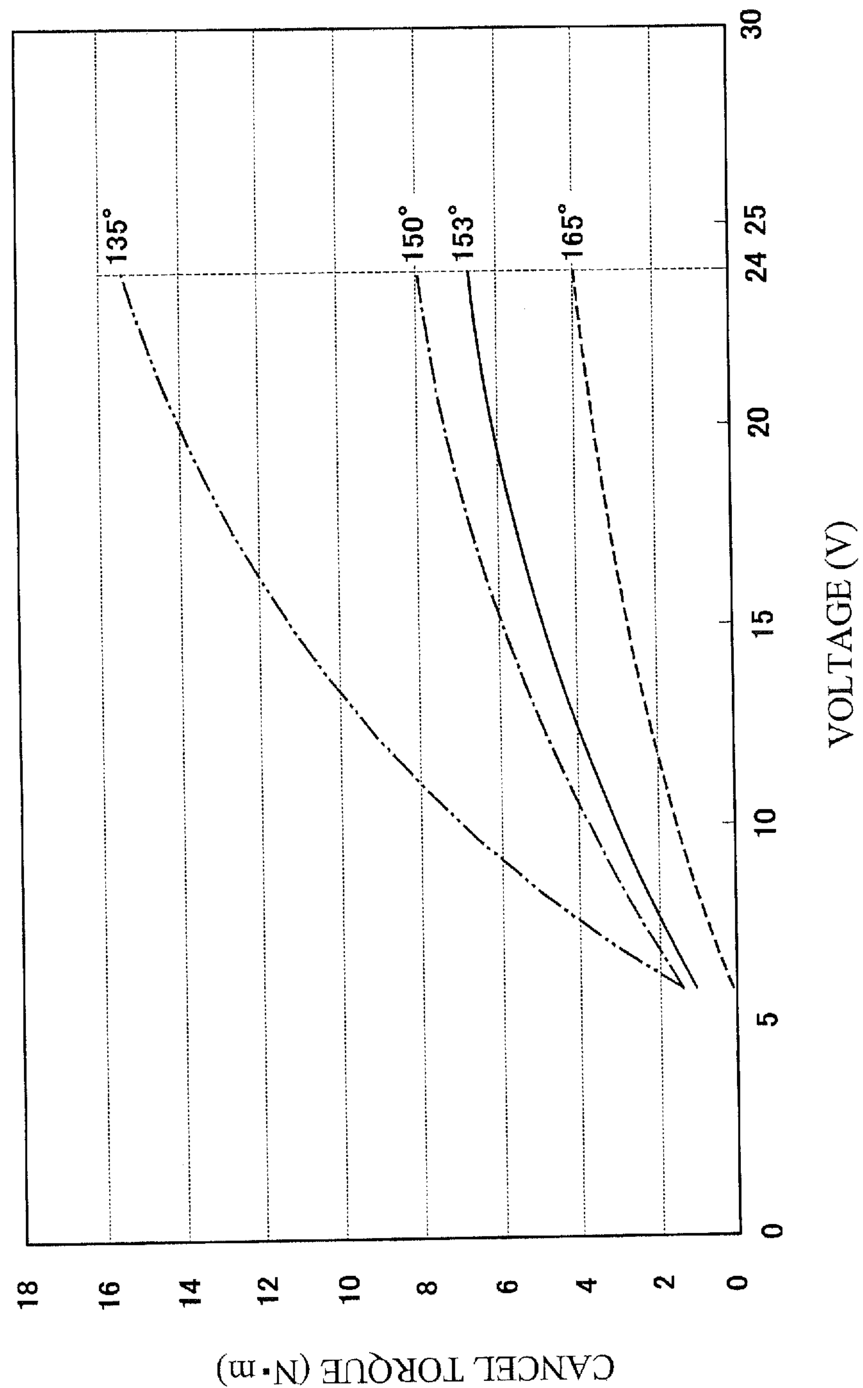
FIG. 5 is a graph showing a relation between a cancel torque and a voltage applied to an electromagnetic adsorption mechanism.

To cancel the detent state of the cam disc 7 as described above, the adsorption plate 25 needs to be separated from the solenoid 26 against the biasing force of the second spring member 28 and the adsorbing force of the solenoid 26 by causing the steel ball 24 to relatively move along the lower or upper inclined surface 31*a* or 32*a*. To be specific, to cancel the detent state of the cam disc 7, the cancel torque corresponding to the adsorbing force of the solenoid 26 needs to be applied to the lever 8. The cancel torque is influenced by not only the adsorbing force of the solenoid 26 but also the gradients $\theta_2$ and $\theta_3$ of the lower and upper inclined surfaces 31*a* and 32*a*. FIG. 5 shows the relation between a voltage applied to the solenoid 26 to change the value of the current and the cancel torque in a case where the gradients $\theta_2$ and $\theta_3$ are changed.

In FIG. 5, a cancel torque (N·m) when each of the gradients $\theta_2$ and $\theta_3$ is 153° is shown by a solid line, a cancel torque (N·m) when each of the gradients $\theta_2$ and $\theta_3$ is 165° is shown by a broken line, a cancel torque (N·m) when each of the gradients $\theta_2$ and $\theta_3$ is 150° is shown by a dashed line, and a cancel torque (N·m) when each of the gradients $\theta_2$ and $\theta_3$ is 135° is shown by a chain double-dashed line. The cancel torque decreases as each of the gradients $\theta_2$ and $\theta_3$ increases. In the case of the mechanical detent mechanism, it is preferable that each of the gradients $\theta_2$ and $\theta_3$ be 135°.

As shown in FIG. 5, the necessary cancel torque decreases as each of the gradients $\theta_2$ and $\theta_3$ increases and as the voltage applied to the solenoid 26 decreases. The difference between the cancel torques due to the gradients $\theta_2$ and $\theta_3$ becomes significant as the voltage applied to the solenoid 26 increases. Especially, this difference in a case where 24 V that is a rated voltage of an industrial product is applied is significant.

In the electromagnetic adsorption mechanism 21 and the like, the adsorbing force is easily lost by slightly separating the adsorption plate 25 from the solenoid 26. Therefore, in a case where the cancel torque is high, the detent state is suddenly canceled at the intermediate position. This may give a driver a big shock when canceling the detent state. In addition, in a case where the cancel torque is low, the steel ball 24 does not firmly engage with the step 31 or 32 even if the current is supplied to the solenoid 26. Thus, the detent function cannot be adequately achieved.

In considerations of these problems, the gradients $\theta_2$ and $\theta_3$ are set so as to respectively satisfy "$150° \leq \theta_2$" and "$\theta_3 \leq 165°$", which are significantly different from the gradients adopted in the mechanical detent mechanism. With this, in the present embodiment, the cancel torque falls within, for example, a range of not less than 3 N·m and not more than 8 N·m. As described above, in the electromagnetic detent mechanism 12, the cancel torque is set within a desired range by appropriately combining the voltage and each of the gradients $\theta_2$ and $\theta_3$. With this, the steel ball 24 firmly engages with the lower or upper inclined surface 31*a* or 32*a*, so that the cam disc 7 is firmly detented. In addition, when returning the cam disc 7 to the neutral position, it is possible to prevent the detent state of the cam disc 7 from being suddenly canceled by suddenly separating the solenoid 26 from the adsorption plate 25. With this, while firmly holding the cam disc 7 at the intermediate position, operational feeling when canceling the detent state can be favorably maintained. Each of the gradients $\theta_2$ and $\theta_3$ is not limited to the above-described range and may fall within the other range.

Figure 6:
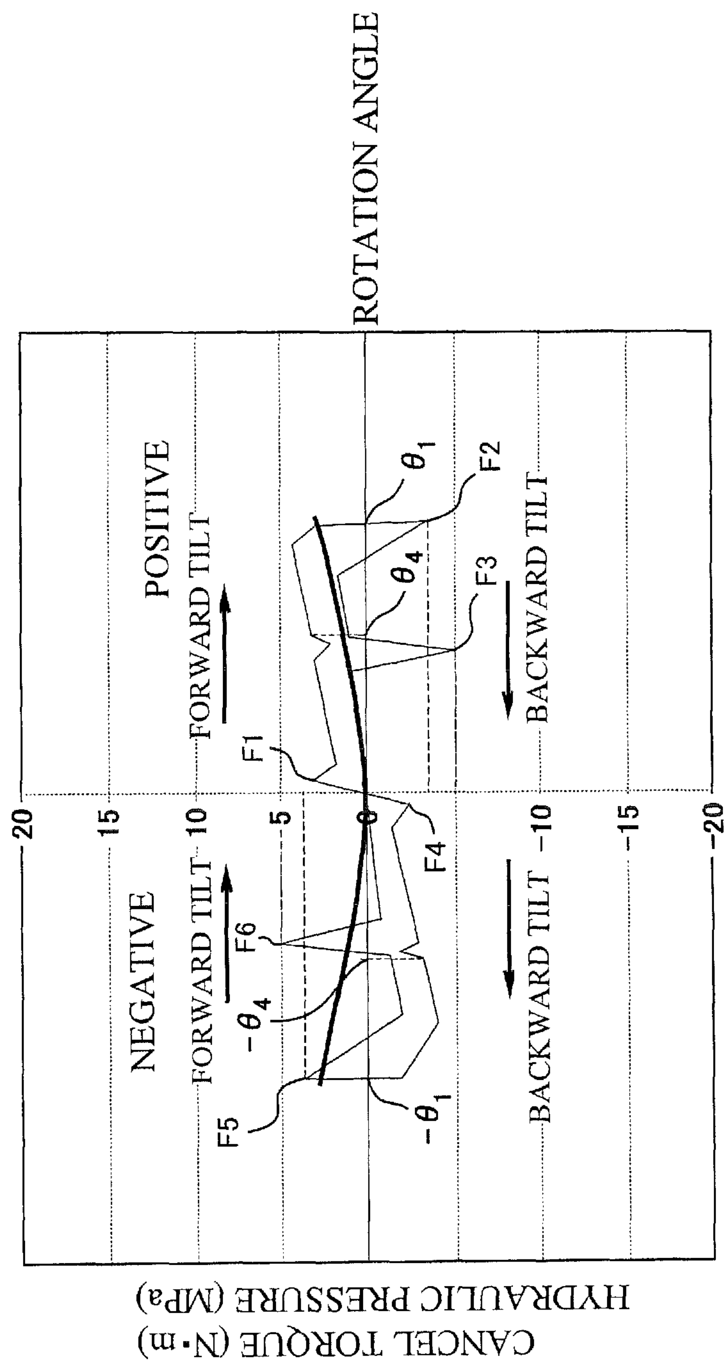
FIG. 6 is a graph showing a relation between a torque necessary to rotate the cam disc and a rotation angle of the cam disc.

Hereinafter, the operation of the hydraulic operated valve 1 when the lever 8 is tilted forward or backward and the torque necessary to tilt the lever 8 will be explained in reference to FIGS. 1, 2, 4, and 6. In FIG. 6, the relation between the tilt angle of the lever 8, that is, the rotation angle of the cam disc 7 and the torque necessary to rotate the cam disc 7 is shown by a thin solid line, and the relation between the rotation angle of the cam disc 7 and the secondary pressure generated by the direction switching valve is shown by a thick solid line. In FIG. 6, regarding the rotation angle of the cam disc 7 and the cancel torque, a counterclockwise direction from the neutral position is a positive direction, and a clockwise direction from the neutral position is a negative direction. In addition, in a region where the rotation angle is positive, the secondary pressure generated by the direction switching valve is the secondary pressure generated by pushing down the first push rod 3, and in a region where the rotation angle is negative, the secondary pressure generated by the direction switching valve is the secondary pressure generated by pushing down the second push rod 4.

First, to push down the first push rod 3, the lever 8 is pushed forward. When the lever is pushed, and the torque acting on the lever 8 becomes a cancel torque F1, the steel ball 16 is detached from the concave groove 18. With this, the held state of the cam disc 7 held at the neutral position is canceled, and the cam disc 7 can be caused to move counterclockwise by tilting the lever 8 against the torque received from the first push rod 3.

As the lever 8 is continuously tilted forward to cause the cam disc 7 to move counterclockwise, the first push rod 3 is pushed down by the cam disc 7. With this, one of the direction switching valves causes the spool to move in accordance with the push-down amount of the first push rod 3 to increase the generated secondary pressure. To be specific, the direction switching valve increases the generated secondary pressure in accordance with the counterclockwise rotation angle of the cam disc 7 (that is, a forward tilt amount of the lever 8).

During this period, the steel balls 16 and 24 of the two detent mechanisms 11 and 12 respectively, relatively move on the middle regions 7*b* and 7*d* of the cam disc 7, and eventually, the steel ball 24 of the electromagnetic detent mechanism 12 reaches the lower step 31. When the lever 8 is further tilted, the steel ball 24 falls down from the step 31 while relatively moving on the lower inclined surface 31*a*. At this time, in a case where the current is being supplied to the electromagnetic adsorption mechanism 21, the steel ball 24 is pressed against the lower inclined surface 31*a* by the rod 23. With this, the cam disc 7 is biased to be rotated counterclockwise (immediately before an intermediate angle $\theta_4$). When the lever 8 is further tilted, the steel ball 24 is separated from the lower inclined surface 31*a*. Therefore, the biasing force acting on the cam disc 7 decreases, and when the rotation angle of the cam disc 7 becomes the intermediate angle $\theta_4$, the steel ball 24 is separated from the lower inclined surface 31*a*. Thus, the pressing force is lost, and the cam disc 7 is not biased counterclockwise.

When the lever 8 is continuously tilted forward, the steel ball 16 of the mechanical detent mechanism 11 approaches to the concave portion 19. When the rotation angle becomes the restriction angle $\theta_1$, the steel ball 16 fits in the concave portion 19. At this time, since the steel ball 16 fits in the concave portion 19 along a wall surface of the concave portion 19 formed in a V shape, the steel ball 16 biases the cam disc 7 counterclockwise. Therefore, the cam disc 7 is guided to the first stroke end position. When the cam disc 7 reaches the first stroke end position (position where the tilt of the cam disc 7 becomes the restriction angle $\theta_1$), the cam disc 7 is detented, and the first push rod 3 is held at the stroke end.

To return the first push rod 3, held at the stroke end as above, to the reference position, the lever 8 is pulled backward. When the torque acting on the lever 8 becomes a cancel torque −F2, the steel ball 16 is detached from the concave portion 19. Thus, the detent state of the cam disc 7 is canceled. With this, the cam disc 7 can be caused to move clockwise by tilting the lever 8 backward. In the present embodiment, the cancel torque −F2 is about −4 N·m, and the shape of the concave portion 19 is designed in accordance with the cancel torque −F2. When the lever 8 is continuously tilted backward, the first push rod 3 is pushed back by the spring member 5. In accordance with this, the spool moves, and the secondary pressure of the direction switching valve decreases. To be specific, the secondary pressure decreases in accordance with the rotation angle of the cam disc 7 (that is, the tilt amount of the lever 8).

After that, the lever 8 is further tilted backward. When the rotation angle of the cam disc 7 becomes the intermediate angle $\theta_4$, the steel ball 24 of the electromagnetic detent mechanism 12 contacts the lower inclined surface 31 a to engage with the step 31. With this, the cam disc 7 is detented at a first intermediate position (position where the tilt of the cam disc becomes the intermediate angle $\theta_4$), and the first push rod 3 is held at an intermediate stroke.

To cancel the detent state, the lever 8 is tilted backward while increasing the torque acting on the lever 8. When the torque acting on the lever 8 becomes a cancel torque −F3, the steel ball 24 starts relatively moving on the lower inclined surface 31*a* while pushing back the rod 23. Regarding a cancel torque F3, since the electromagnetic adsorption mechanism 21 used by causing the adsorption plate 25 to be in close contact with the solenoid 26 is adopted, the difference between forward and backward detent cancel forces can be made small even if the processing accuracy and positional accuracy of the electromagnetic adsorption mechanism 21 vary among respective products. In addition, since the steel ball 24 is separated from the lower region 7*e*, the solenoid 26 and the adsorption plate 25 can be caused to be surely in close contact with each other. Thus, the variations of the products are further suppressed.

Eventually, the steel ball 24 finishes climbing the lower inclined surface 31*a* and gets over the step 31 to reach the middle region 7*d*. With this, the detent state at the first intermediate position is canceled. In the present embodiment, the current adjuster adjusts the current supplied to the solenoid 26 such that the voltage applied to the solenoid 26 becomes 22 V. With this, the cancel torque −F3 becomes about −5 N·m. To be specific, the cancel torque necessary to cancel the detent state at the intermediate position is close to the cancel torque necessary to cancel the detent state at the stroke end position. To be specific, the detent state can be canceled by a feeling similar to the mechanical detent mechanism 11.

When the detent state at the intermediate position is canceled, the lever 8 can be tilted backward, so that the cam disc 7 can be returned to a middle position. When the detent state is canceled, the steel balls 16 and 24 are respectively pressed against the middle regions 7*b* and 7*d*, so that the torque that causes the cam disc 7 to move to the middle position acts on the cam disc 7. Therefore, when the detent state at the intermediate position is canceled, the cam disc 7 can be returned to the neutral position even if the torque acting on the lever 8 is not high.

In a case where the current is being supplied to the solenoid 26 as above, the cam disc 7 is detented at the first intermediate position. In contrast, in a case where the current is not being supplied to the solenoid 26, a force of pressing the steel ball 24 against the outer surface of the cam disc 7 is low. Therefore, the steel ball 24 relatively moves on the lower inclined surface 31 a while lifting up the rod 23 against the second spring member 28. To be specific, the steel ball 24 does not engage with the step 31, and the cam disc 7 can be returned from the stroke end position to the neutral position at once. By stopping supplying the current to the electromagnetic adsorption mechanism 21 as above, the detent function at the first intermediate position is disabled. To be specific, the detent function can be stopped only by stopping the supplied current. For example, in a case where the detent function is not used due to operation contents or even in a case where the use of the detent function is being legally banned, the detent function can be easily stopped without, for example, detaching the detent mechanism 12.

The operational advantages when pushing down the second push rod 4 are substantially the same as those when pushing down the first push rod 3 except that the direction in which the lever 8 is tilted, the position where the cam disc 7 is detented, and the like are different therebetween. Hereinafter, a case where the second push rod 4 is pushed down will be simply explained.

To push down the second push rod 4, the lever 8 is pulled backward. When the torque acting on the lever 8 becomes a cancel torque F4 (=cancel torque −F1), the steel ball 16 is detached from the concave groove 18. Even after the steel ball 16 is detached from the concave groove 18, the lever 8 is tilted against the torque from the second push rod 4. With this, the second push rod is pushed down, and the direction switching valve generates the secondary pressure corresponding to the push-down amount of the second push rod.

When the lever 8 is continuously tilted, the steel ball 24 falls down from the step 32 while moving on the upper inclined surface 32*a*. Eventually, the cam disc 7 reaches the second stroke end position (position where the tilt of the cam disc 7 becomes the restriction angle $-\theta_1$), and the steel ball 24 fits in the concave groove 20. Thus, the cam disc 7 is detented at the second stroke end position. To be specific, the second push rod 4 is held at the stroke end.

To return the second push rod 4 to the reference position, the lever 8 is pulled backward. When the torque acting on the lever 8 becomes a cancel torque F5 (=cancel torque −F2), the steel ball 16 is detached from the concave portion 19. Thus, the detent state is canceled. When the lever 8 is continuously tilted backward, the second push rod 4 is pushed back by the spring member 5. Thus, the secondary pressure decreases in accordance with the push-back amount of the second push rod 4.

After that, the lever 8 is further tilted backward. When the rotation angle of the cam disc 7 becomes the intermediate angle $-\theta_4$, the steel ball 24 of the electromagnetic detent mechanism 12 contacts the upper inclined surface 32*a* to engage with the step 32. Thus, the cam disc 7 is detented at the second intermediate position (position where the tilt of the cam disc becomes the intermediate angle $-\theta_4$). To be specific, the second push rod 4 is held at the intermediate stroke.

Further, to cancel the detent state, the lever 8 is tilted backward while increasing the torque acting on the lever 8. When the torque acting on the lever 8 becomes a cancel torque F6 (=cancel torque −F3), the steel ball 24 starts relatively moving on the lower inclined surface 32*a* while pushing back the rod 23. Eventually, the steel ball 24 finishes climbing the upper inclined surface 32*a* and reaches the middle region 7*d*, that is, the steel ball 24 gets over the step 32. Thus, the detent state is canceled. Then, by tilting the lever 8 forward, the cam disc 7 is returned to the neutral position.

In the hydraulic operated valve 1 configured as above, the detent functions at the neutral position and the first and second stroke end positions are achieved by the mechanical detent mechanism 11, and the detent functions at the first and second intermediate positions are achieved by the electromagnetic detent mechanism 12. In the electromagnetic detent mechanism 12, when the steel ball 24 engages with the step 31 or 32, the adsorption plate 25 is adsorbed by the solenoid 26, and the steel ball 24 is restricted by the step 31 or 32 and the solenoid 26. Therefore, if the steel ball 24 of the electromagnetic detent mechanism 12 is pressed by the lower region 7*e* or the upper region 7*f*, the steel ball 24 is excessively restricted. However, by forming the gap d between the steel ball 24 and each of the lower region 7*e* and the upper region 7*f*, the steel ball 24 is prevented from being excessively restricted at each of the first and second intermediate positions.

In addition, since the steel ball 24 does not contact each of the lower region 7*e* and the upper region 7*f*, the wear of the steel ball 24 can be suppressed. Therefore, the durability of the steel ball 24 can be improved. Further, it is possible to prevent a phenomenon in which the steel ball 24 wears to deform, the engaging force between the steel ball 24 and each of the steps 31 and 32 decreases, and therefore, the cancel torque decreases. To be specific, the detent functions at the first and second intermediate positions can be prevented from deteriorating, and the change in the operational feeling due to the long-term use can be suppressed.

In the case of the mechanical detent mechanism 11, the steel ball 16 is pressed by the first spring member 17. The pressing force of the first spring member 17 does not change rapidly as compared to the pressing force of the solenoid. Therefore, even if the processing accuracy and positional accuracy of the mechanical detent mechanism 11 differ among respective products, the mechanical detent mechanism 11 can absorb those differences. By adopting the mechanical detent mechanism 11 together with the electromagnetic detent mechanism 12, it is possible to easily produce the hydraulic operated valve 1 that realizes both the switching of the detent functions and the excellent detent functions at all the positions that are the neutral position, the first and second intermediate positions, and the first and second stroke end positions.

In addition, according to the hydraulic operated valve 1, by changing the value of the current, supplied to the solenoid 26, by the current adjuster 30, the cancel torques F3 and F6 at the first and second intermediate positions are switched, so that the operational feeling when canceling the detent state can be changed. As above, the cancel torques F3 and F6 can be changed only by changing the value of the current supplied to the solenoid 26. Therefore, to change the cancel torques F3 and F6, it is unnecessary to change the second spring member 28. Thus, the adjustment of the cancel torques F3 and F6 is easy.

In the present embodiment, the mechanical detent mechanism 11 is adopted to detent the cam disc 7 at the neutral position and the first and second stroke end positions. However, the electromagnetic detent mechanism 12 may be adopted. The cam disc 7 does not have to be a plate-shaped member and may be a block-shaped member.

The above example has described a case where the dent mechanism is applied to the hydraulic operated valve configured to generate the secondary pressure as an output value in accordance with the tilt amount of the, lever. However, the dent mechanism may be applied to the operating device configured to output a current value or a voltage value. To be specific, the operating device is configured to switch devices (that is, output directions) configured to output a signal (current or voltage) in accordance with the rotation direction of the cam. In addition, the operating device is configured to change the magnitude of the signal (current value or voltage value) in accordance with the rotation angle of the cam. Further, the operating device has the same components, such as the cam disc and the detent mechanism, as the hydraulic operated valve 1.

The present invention is not limited to the embodiment, and additions, deletions, and modifications may be made within the spirit of the present invention.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

REFERENCE SIGNS LIST

1 hydraulic operated valve
7 cam disc
7*a* front surface
7*c* rear surface
7*f* upper region
7*e* lower region
11 detent mechanism
12 detent mechanism
16 steel ball
18 concave groove
21 electromagnetic adsorption mechanism
24 steel ball
25 adsorption plate
26 solenoid
30 adjuster
31 step
32 step

The invention claimed is:

1. An operating device configured to switch an output direction in accordance with a rotation direction of a cam and generate an output value corresponding to a rotation angle of the cam, the operating device comprising:

an engaging member configured to contact an outer surface of the cam; and an electromagnetic adsorption mechanism configured to, when a current is supplied to an excitation unit, cause an adsorbing body to be adsorbed by the excitation unit and press the engaging member toward the outer surface of the cam, wherein:

two steps are formed on the outer surface of the cam, each of the steps being configured to, when the cam is rotated, engage with the engaging member, pressed by the electromagnetic adsorption mechanism, to detent the cam; and the two steps are configured such that by returning the cam, the adsorbing body is separated from the excitation unit against pressing of the electromagnetic adsorption mechanism.

2. The operating device according to claim 1, wherein:

the outer surface of the cam includes a middle region located between the two steps and two outer regions respectively located on both sides of the middle region and connected to the middle region via the steps; and the two steps respectively include inclined surfaces, with each of which the engaging member contacts, a gradient θ formed by each of the inclined surfaces and the adjacent outer region being not smaller than 150° and not larger than 165°.

3. The operating device according to claim 1, further comprising a current adjuster configured to adjust a value of a current, supplied to the excitation unit of the electromagnetic adsorption mechanism, to control a pressing force applied to the engaging member.

4. The operating device according to claim 1, further comprising a pressing mechanism configured to bias a contact member by a spring member to press the contact member against the outer surface of the cam, wherein three grooves are formed on the outer surface of the cam, the contact member engaging with each of the three grooves in a case where the cam is located at each of a neutral position that is a base point when rotating the cam and two stroke end positions respectively located away from the neutral position to one side and the other side.

5. The operating device according to claim 2, further comprising a current adjuster configured to adjust a value of a current, supplied to the excitation unit of the electromagnetic adsorption mechanism, to control a pressing force applied to the engaging member.

6. The operating device according to claim 2, further comprising a pressing mechanism configured to bias a contact member by a spring member to press the contact member against the outer surface of the cam, wherein three grooves are formed on the outer surface of the cam, the contact member engaging with each of the three grooves in a case where the cam is located at each of a neutral position that is a base point when rotating the cam and two stroke end positions respectively located away from the neutral position to one side and the other side.

7. The operating device according to claim 3, further comprising a pressing mechanism configured to bias a contact member by a spring member to press the contact member against the outer surface of the cam, wherein three grooves are formed on the outer surface of the cam, the contact member engaging with each of the three grooves in a case where the cam is located at each of a neutral position that is a base point when rotating the cam and two stroke end positions respectively located away from the neutral position to one side and the other side.

8. The operating device according to claim 5, further comprising a pressing mechanism configured to bias a contact member by a spring member to press the contact member against the outer surface of the cam, wherein three grooves are formed on the outer surface of the cam, the contact member engaging with each of the three grooves in a case where the cam is located at each of a neutral position that is a base point when rotating the cam and two stroke end positions respectively located away from the neutral position to one side and the other side.

* * * * *